Sept. 24, 1963    P. L. SILIANI ET AL    3,105,175
SELF-ADJUSTING CONDUCTION RESPONSIVE RELAY CIRCUIT
Filed May 17, 1960

INVENTOR:
PIER LUIGI SILIANI
By
Richardson, David and Nardon
ATTY'S.

United States Patent Office 3,105,175
Patented Sept. 24, 1963

3,105,175
SELF-ADJUSTING CONDITION RESPONSIVE
RELAY CIRCUIT
Pier Luigi Siliani, Via Pietro Fanfani 27,
Florence, Italy
Filed May 17, 1960, Ser. No. 29,677
Claims priority, application Italy May 26, 1959
4 Claims. (Cl. 317—148.5)

This invention relates to an electrical system for controlling a physical quantity. In particular the system is designed to control the temperature of an enclosure, or maintain a constant temperature in an enclosure, and is applicable in a room, a refrigerator, a furnace and so on. Alternatively, the system may be used for speed control or control of mechanical forces or other quantities which can affect the equilibrium of an electrical bridge.

The present invention has as a principal object provision of an electrical system for controlling a physical quantity, comprising a bridge circuit having in at least one arm thereof a resistance or resistor which is variable with the quantity to be controlled, and an amplifier connected in a diagonal of the bridge to allow a control current to be supplied to a relay when the bridge is unbalanced, and wherein, in order to reduce the operating range of the relay, the characteristics of the bridge are modified upon energisation of the relay in such a manner as to reduce the control current to a value close to the value at which the relay is de-energized.

The variable resistance or resistor may be a thermistor affected for instance by the temperature of a room.

The system may also be arranged in such a manner as to attain an unstable equilibrium in the operating range of the relay and within this range a continuous series of opening and closing operations of the relay is obtained. The frequency of operation of the relay may be varied by means of a resistance-capacitance coupling connected to the one or more further resistances.

In the diagonal of the bridge, a transistor may be inserted to form a detector and amplifier of the energization current of the relay.

Figure 1:
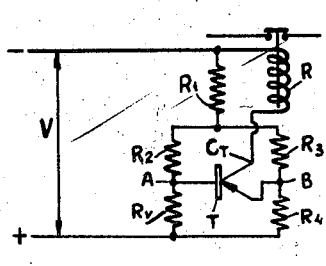
Figure 3:
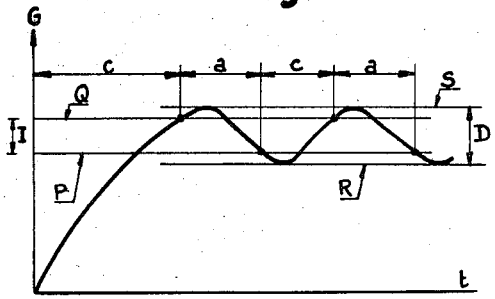
Figure 2:
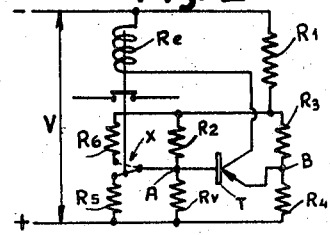
Figure 4:
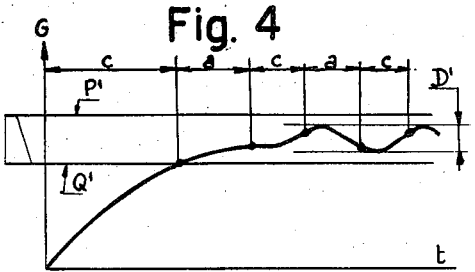
Figure 5:
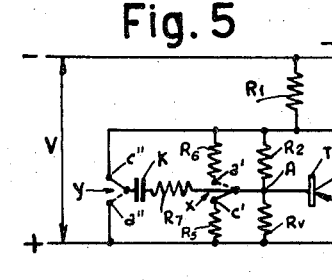
Figure 6:
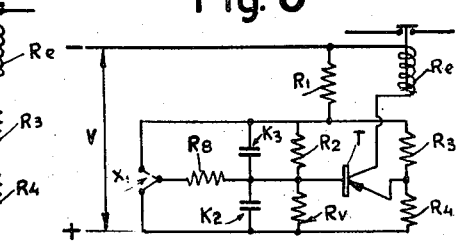
Figure 7:
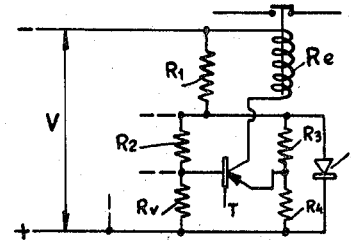
Figure 8:
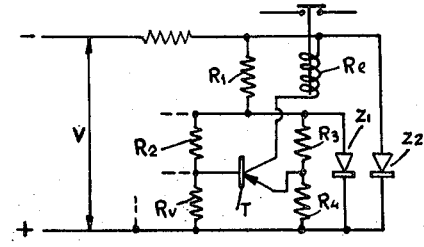

The invention will be better understood from the following description given by way of example only with reference to the accompanying drawings in which:

FIGURE 1 illustrates a prior known circuit.
FIGURE 2 illustrates a circuit embodying system according to the invention.
FIGURES 3 and 4 graphically illustrate how a quantity G may be controlled by the circuits of FIGURES 1 and 2, respectively.
FIGURES 5 and 6 illustrate other circuits according to the invention.
FIGURES 7 and 8 illustrate voltage stabilization circuits for the bridge.

FIGURE 1 shows a known circuit, supplied by direct current of voltage V, which includes four resistances $R_V$, $R_2$, $R_3$, $R_4$ which form a bridge to which a transistor amplifier T is coupled in the diagonal between the points A and B. $R_1$ is a dropping resistance for the bridge supply. In the equilibrium condition, i.e. when $$\frac{R_V}{R_2} = \frac{R_4}{R_3}$$

the potential difference between the points A and B is zero, and the emitter-base path of the transistor T is not conducting, so that there is substantially no current through the relay R which remains de-energized. This relay is designed to control directly or indirectly the physical quantity under consideration.

The resistance $R_V$ is continuously variable directly or indirectly with respect to the physical quantity. The relay R may, for instance, be arranged to control the heating means of a room, the resistance $R_V$ being sensitive to variations of the room temperature and varying in value accordingly. In this instance the resistance $R_V$ may be a thermistor. Relay R is shown in energized condition in FIG. 1.

When the resistance $R_V$ increases, point A becomes more negative than the point B, a current passes through the emitter-base path of the transistor T and the collector circuit $C_T$ of the transistor T conducts current. This current which may be further amplified (in a manner not shown) acts to energize relay R.

It is known that the energization current of a relay is considerably higher than the de-energization current, unless certain types of movable coil micro-relays are used which are very expensive and have very delicate structures. Consequently the interval between energization and de-energization is always substantial and dependent upon the relation of the said quantity under consideration and the resistance $R_V$, upon the amplification of the transistor T (or upon the transistor system when the collector current is in turn amplified), and finally upon the characteristics of the relay R.

FIGURE 2 shows a circuit according to the invention which allows the interval or operating range of the relay to be reduced to any desired value. This reduction is obtained by arranging two resistances $R_5$ and $R_6$ in such a manner that they may be inserted in parallel with resistances $R_V$ and $R_2$ respectively, through a changeover switch X between point A and each of said resistances. Relay Re is shown in an energized state with resistance $R_5$ connected directly to point A by a movable switch arm X of the relay. The arrangement is such that de-energizing of relay Re causes open circuiting of the resistance $R_5$ and insertion of the resistance $R_6$, or switching over of the movable relay arm X connected to point A from resistance $R_5$ to resistance $R_6$ (dotted line position) if it is desired to maintain the system symmetrical. The resistance values of $R_5$ and/or $R_6$ are such as to vary the biasing of the transistor T so as to bring the collector current back to a value as close as may be desired to the de-energisation value of the relay. A minimum variation of $R_V$ is sufficient to imbalance the bridge and de-energise relay Re. By adjustment of one of the bridge resistances the desired operational point may be adjusted and by adjustment of the resistances $R_5$ and/or $R_6$ the interval or operational range of the relay may be adjusted.

The circuit also allows a fine adjustment of the quantity to be controlled, with a certain inertia.

The control characteristic of FIGURE 1 is represented by the curve of FIGURE 3, wherein the abscissa indicates time $t$ and the ordinate indicates the quantity G (such as temperature) to be controlled. The lines P and Q define the interval or operating range I of the control system, the de-energizing of the relay occurring along line Q and the energizing of the relay occurring along the line P. The opening and closing cycles are indicated by $a$ and $c$. As seen in the diagram of FIGURE 3, the adjustment allows the quantity G to vary over the range D which is greater than the operating range I. This latter range I may be reduced as much as may be desired by means of the circuit shown in FIGURE 2. Another reduction of the range D of the quantity when subject to inertia, is obtained when the system begins the adjustment at the lower limit of the range I, i.e. as shown in FIGURE 4 on the line Q', instead of on the line P' and effects in the range P'Q' a cycle of closure and opening whose ratio will be related to the value of the quantity in the range P'Q'. The cycle period will be related to the inertia of the control. Thus, one obtains an operating characteristic as shown in FIGURE 4 wherein the range D' of the quantity may be easily contained in the operating range of the system.

Such a characteristic may be obtained by modifying the circuit of FIGURE 2 as shown in FIGURE 5 or in FIGURE 6. In these figures the parts corresponding to those of FIGURE 2 have the same reference numerals. Relay $Re$ is shown in energized condition in both FIGURES 5 and 6. As shown in FIGURE 5, the embodiment of FIGURE 2 has been modified by a resistance-capacitance coupling formed by a resistance $R_7$ and by a capacitance K inserted between the point A and another relay switch arm Y. The values of the resistances $R_5$ and $R_6$ are such that for resistance $Rv$ between certain values, the de-energizing of the relay operates the changeover switch X to disconnect point A from $R_5$ and connect point A to $R_6$ to reduce the current of the relay $Re$ below the energisation values, and vice-versa. Thus an unstable operational range is created. Simultaneously with the switching of switch X from point $a'$ to point $c'$ and switching of point A from $R_5$ to $R_6$, the coupling $R_7K$ is switched in an opposite manner as switch arm Y moves from point $a''$ to point $c''$, so that the charging current of the capacitor K, passing through the resistance $R_7$ will annul, for a time depedent upon the constant of $R_7K$, the effect of the operation of switch X delaying the next de-energizing of the relay. The several positions of switches X and Y are indicated by $a'$, $c'$ and $a''$, $c''$, respectively, in FIGURE 5. The operation is repeated until $R_V$ is kept within the unstable range which may be varied at will by adjusting the values of $R_5$ and $R_6$.

According to FIGURE 6, instead of the resistances $R_5$, $R_6$, a single resistance $R_8$ is used and is switched over by a switch $X_1$ controlled by the relay $Re$. Capacitors $K_2$, $K_3$ are designed to delay the effect of switching over the resistance.

The illustrated circuits are particularly useful as temperature controlling devices wherein $Rv$ is a resistance with a high temperature coefficient (such as a thermistor). In this application, the device has the advantage over the usual thermostats of allowing a very small temperature-sensitive element to be used which can be introduced into the smallest cavity and which can have a thermal inertia of the order of a fraction of a second for each degree C. The temperature-sensitive element may furthermore be located remote from the control device and by using a number of appropriately connected temperature-sensitive elements, it is possible to control with a single control system the average temperature of several rooms or several parts of the same room, and allowing for different controlled temperatures in the several rooms or parts of a room.

With regard to the sensitivity of the circuit to the variations of the supply voltage, it is to be noted that with the emitter-base connections of the transistor in the A—B diagonal of the bridge, the system is relatively insensitive, to the variations of the voltage. However, should the supply source be very subject to considerable fluctuation, the resistance bridge can be stabilised, for instance, with a diode Z arranged as in FIGURE 7, or for great accuracy with two suitable stabilising elements $Z_1$, $Z_2$ arranged as in FIGURE 8.

It is also to be noted that the circuit of FIGURE 5 or FIGURE 6 may be used as a periodic switch with an operating range and operating frequency which are adjustable at will. Relay $Re$ is shown in energized condition in both FIGURES 7 and 8.

In order to restrict as far as possible the effect of push-pull which occurs upon passage of the current in the relay $Re$ through the resistance $R_4$, the resistance $R_4$ may be replaced by a diode which stabilizes the emitter voltage, provides a low dynamic resistance and considerably increases the amplification effect of the transistor T.

The drawings show only a number of embodiments of the invention by way of example and these may be varied considerably without departing from the scope of the invention which is defined in the appended claims.

What I claim is:

1. A condition responsive electric circuit, comprising a relay having a pair of contacts and a switch arm movable from one of the contacts to the other, four resistors interconnected to form a rectangular bridge, three of said resistors having constant resistance values, the fourth one of said resistors being variable in response to ambient temperature, a transistor amplifier having a bias element connected between opposite diagonal points of said bridge, one of said points being a point of connection of the first and second of said resistors, the other of said points being a point of connection of the third and fourth one of said resistors, a power supply having two terminals of opposite polarity, said relay having a winding connected between one of said terminals and a current emitting point of said amplifier, a fifth resistor, and a sixth resistor, the fifth resistor being connected between one of said contacts and a point of connection of the second and fourth resistors, the other of said terminals being connected to the last named point of connection, the sixth resistor being connected between the other of said contacts and a point of connection of the first and third resistors, said switch arm being connected to a point of connection of the third and fourth resistors, whereby a change in the resistance of the fourth resistor caused by a change in ambient temperature causes a change in current passing through said winding to switch said arm from either one of said pair of contacts to the other, so that the relay is rendered responsive to a different change in ambient temperature than previously.

2. A condition responsive electric circuit according to claim 1, further comprising another pair of contacts, another switch arm movable by said relay from a first one of said other pair of contacts to a second one of said other pair of contacts, and a resistance-capacitance network connected between said other switch arm and the point of connection of the third and fourth resistors, said resistance capacitance network causing a time delay in response of said relay subsequent to a change in ambient temperature.

3. A condition responsive electric circuit according to claim 2, further comprising a diode connected across opposite diagonal points of the bridge to stabilize the voltage applied to the amplifier.

4. A condition responsive electric circuit according to claim 2, further comprising a pair of diodes, respectively connected across opposite diagonal points of the bridge to stabilize voltages applied to the bridge, amplifier and relay.

References Cited in the file of this patent

UNITED STATES PATENTS

| | | |
|---|---|---|
| 2,057,902 | Moreau | Oct. 20, 1936 |
| 2,542,499 | Fortescue | Feb. 20, 1951 |

FOREIGN PATENTS

| | | |
|---|---|---|
| 664,963 | Great Britain | Jan. 16, 1952 |

OTHER REFERENCES

AIEE Technical Paper, 48–224, August 1948, Advance Copy, pp. 11, 12, and 17.